US010812359B2

(12) United States Patent
Ohno et al.

(10) Patent No.: US 10,812,359 B2
(45) Date of Patent: Oct. 20, 2020

(54) SERVICE PROVIDING DEVICE, ALTERNATIVE SERVICE PROVIDING DEVICE, RELAYING DEVICE, SERVICE PROVIDING SYSTEM, AND SERVICE PROVIDING METHOD

(71) Applicant: Yokogawa Electric Corporation, Musashino-shi, Tokyo (JP)

(72) Inventors: Takeshi Ohno, Tokyo (JP); Nobuaki Ema, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 415 days.

(21) Appl. No.: 15/497,864

(22) Filed: Apr. 26, 2017

(65) Prior Publication Data

US 2017/0317909 A1 Nov. 2, 2017

(30) Foreign Application Priority Data

Apr. 28, 2016 (JP) ................................ 2016-092043

(51) Int. Cl.

*H04L 12/26* (2006.01)
*H04L 12/24* (2006.01)
*H04B 7/14* (2006.01)
*H04L 29/08* (2006.01)

(52) U.S. Cl.

CPC ............... *H04L 43/10* (2013.01); *H04B 7/14* (2013.01); *H04L 41/0663* (2013.01); *H04L 67/125* (2013.01); *Y04S 40/166* (2013.01); *Y04S 40/168* (2013.01)

(58) Field of Classification Search

CPC .......... H04L 43/10; H04L 67/125; H04B 7/14
See application file for complete search history.

(56) References Cited

U.S. PATENT DOCUMENTS 9,584,363 B1 * 2/2017 Olson ................ G06F 11/2048
2007/0041327 A1 * 2/2007 Foster ................ H04L 65/1043 370/242
2008/0148098 A1 * 6/2008 Chen .................. G06F 11/2028 714/13
2013/0311617 A1 11/2013 Takahashi et al.
(Continued)

FOREIGN PATENT DOCUMENTS

JP 2000-218476 A 8/2000
WO 2015/098589 A1 7/2015

*Primary Examiner* — Moustafa M Meky
*Assistant Examiner* — Kidest Mendaye
(74) *Attorney, Agent, or Firm* — Sughrue Mion, PLLC

(57) ABSTRACT

A service providing device included in a process control system in a plant, the service providing device includes a communicator configured to perform communication via a network, a service provider configured to provides a service via the communicator by exclusively assigning first identification information to one of the service providing device and an alternative service providing device, the first identification information being common to the alternative service providing device which provides the service instead of the service providing device, and a heartbeat transmitter configured to transmit heartbeat information for notifying that the service is normal to the alternative service providing device via a relaying device by using second identification information which is different from the first identification information.

5 Claims, 12 Drawing Sheets

(56) References Cited

U.S. PATENT DOCUMENTS

2013/0311654 A1* 11/2013 Lei .......................... H04L 67/22
709/224
2014/0379900 A1 12/2014 Dasgupta et al.
2015/0019671 A1* 1/2015 Yasuda ............... H04L 43/0805
709/208
2015/0113340 A1 4/2015 Gao
2016/0127509 A1* 5/2016 Uriel ..................... H04L 61/103
709/203
2016/0321199 A1* 11/2016 Matsubayashi ..... G06F 13/1668

* cited by examiner

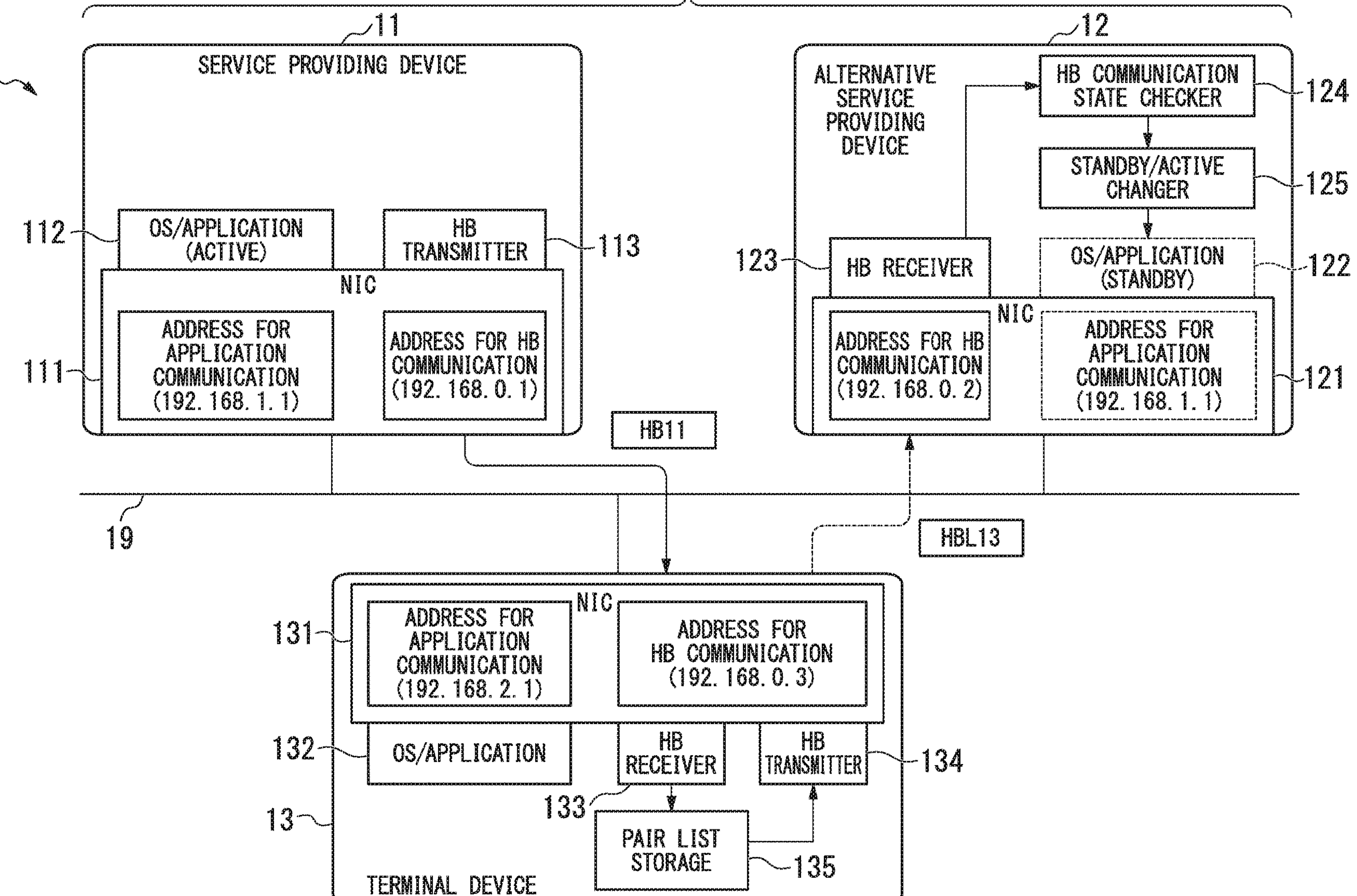
FIG. 1
REDUNDANT (PAIR) CONFIGURATION
10
11
SERVICE PROVIDING DEVICE
112
OS/APPLICATION (ACTIVE)
HB TRANSMITTER
113
NIC
111
ADDRESS FOR APPLICATION COMMUNICATION (192. 168. 1. 1)
ADDRESS FOR HB COMMUNICATION (192. 168. 0. 1)
12
ALTERNATIVE SERVICE PROVIDING DEVICE
HB COMMUNICATION STATE CHECKER
124
STANDBY/ACTIVE CHANGER
125
123
HB RECEIVER
OS/APPLICATION (STANDBY)
122
NIC
ADDRESS FOR HB COMMUNICATION (192. 168. 0. 2)
ADDRESS FOR APPLICATION COMMUNICATION (192. 168. 1. 1)
121
HB11
19
HBL13
NIC
131
ADDRESS FOR APPLICATION COMMUNICATION (192. 168. 2. 1)
ADDRESS FOR HB COMMUNICATION (192. 168. 0. 3)
132
OS/APPLICATION
HB RECEIVER
HB TRANSMITTER
134
133
13
PAIR LIST STORAGE
135
TERMINAL DEVICE

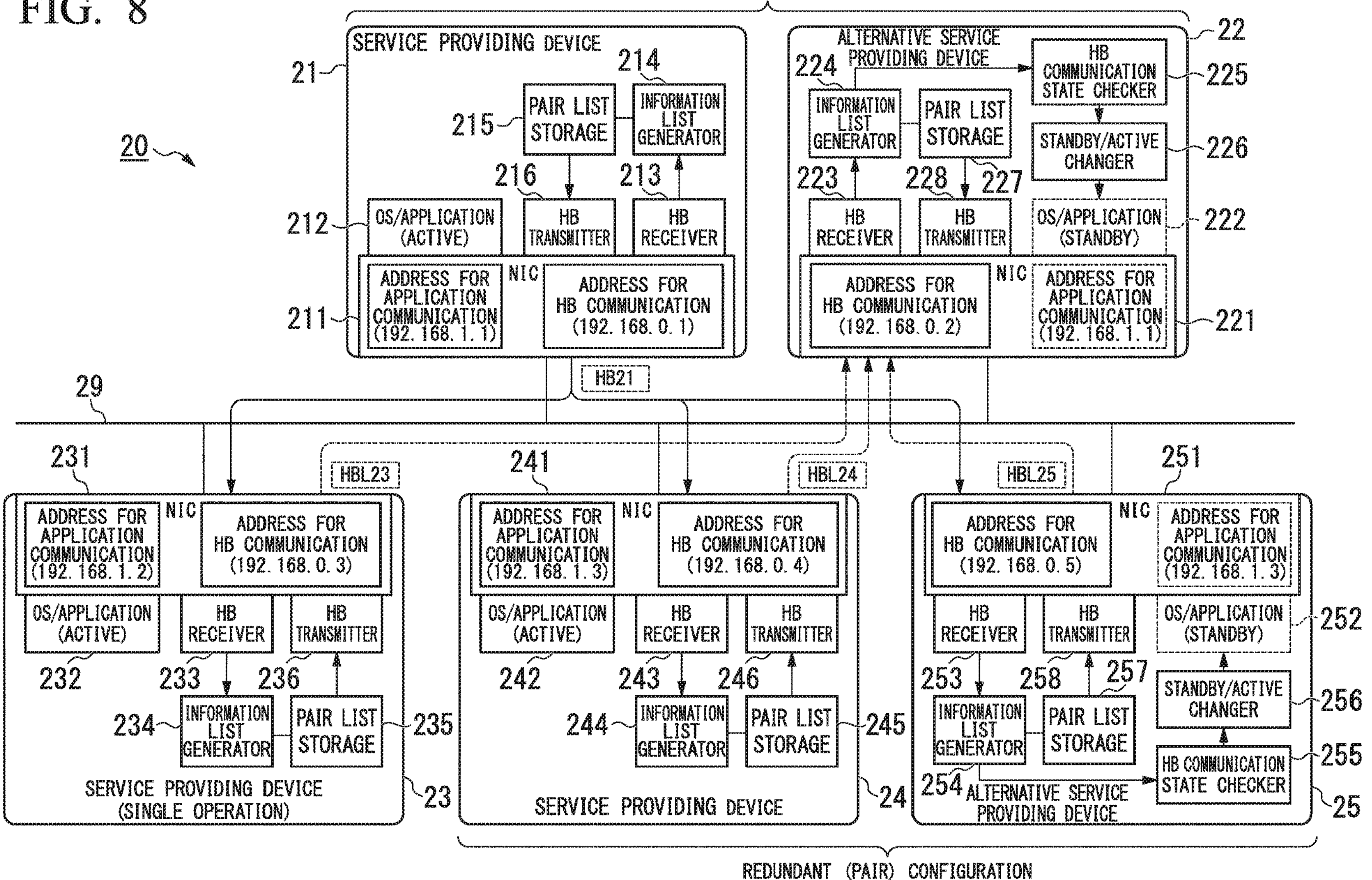
FIG. 8
20
REDUNDANT (PAIR) CONFIGURATION
SERVICE PROVIDING DEVICE
21
215
PAIR LIST STORAGE
214
INFORMATION LIST GENERATOR
216
213
212
OS/APPLICATION (ACTIVE)
HB TRANSMITTER
HB RECEIVER
211
ADDRESS FOR APPLICATION COMMUNICATION (192. 168. 1. 1)
NIC
ADDRESS FOR HB COMMUNICATION (192. 168. 0. 1)
ALTERNATIVE SERVICE PROVIDING DEVICE
22
224
INFORMATION LIST GENERATOR
PAIR LIST STORAGE
HB COMMUNICATION STATE CHECKER
225
STANDBY/ACTIVE CHANGER
226
223
228
227
HB RECEIVER
HB TRANSMITTER
OS/APPLICATION (STANDBY)
222
ADDRESS FOR HB COMMUNICATION (192. 168. 0. 2)
NIC
ADDRESS FOR APPLICATION COMMUNICATION (192. 168. 1. 1)
221
HB21
29
231
HBL23
ADDRESS FOR APPLICATION COMMUNICATION (192. 168. 1. 2)
NIC
ADDRESS FOR HB COMMUNICATION (192. 168. 0. 3)
OS/APPLICATION (ACTIVE)
HB RECEIVER
HB TRANSMITTER
232
233
236
234
INFORMATION LIST GENERATOR
PAIR LIST STORAGE
235
SERVICE PROVIDING DEVICE (SINGLE OPERATION)
23
241
HBL24
ADDRESS FOR APPLICATION COMMUNICATION (192. 168. 1. 3)
NIC
ADDRESS FOR HB COMMUNICATION (192. 168. 0. 4)
OS/APPLICATION (ACTIVE)
HB RECEIVER
HB TRANSMITTER
242
243
246
244
INFORMATION LIST GENERATOR
PAIR LIST STORAGE
245
SERVICE PROVIDING DEVICE
24
HBL25
251
ADDRESS FOR HB COMMUNICATION (192. 168. 0. 5)
NIC
ADDRESS FOR APPLICATION COMMUNICATION (192. 168. 1. 3)
HB RECEIVER
HB TRANSMITTER
OS/APPLICATION (STANDBY)
252
253
258
257
INFORMATION LIST GENERATOR
PAIR LIST STORAGE
STANDBY/ACTIVE CHANGER
256
HB COMMUNICATION STATE CHECKER
255
254
ALTERNATIVE SERVICE PROVIDING DEVICE
25
REDUNDANT (PAIR) CONFIGURATION

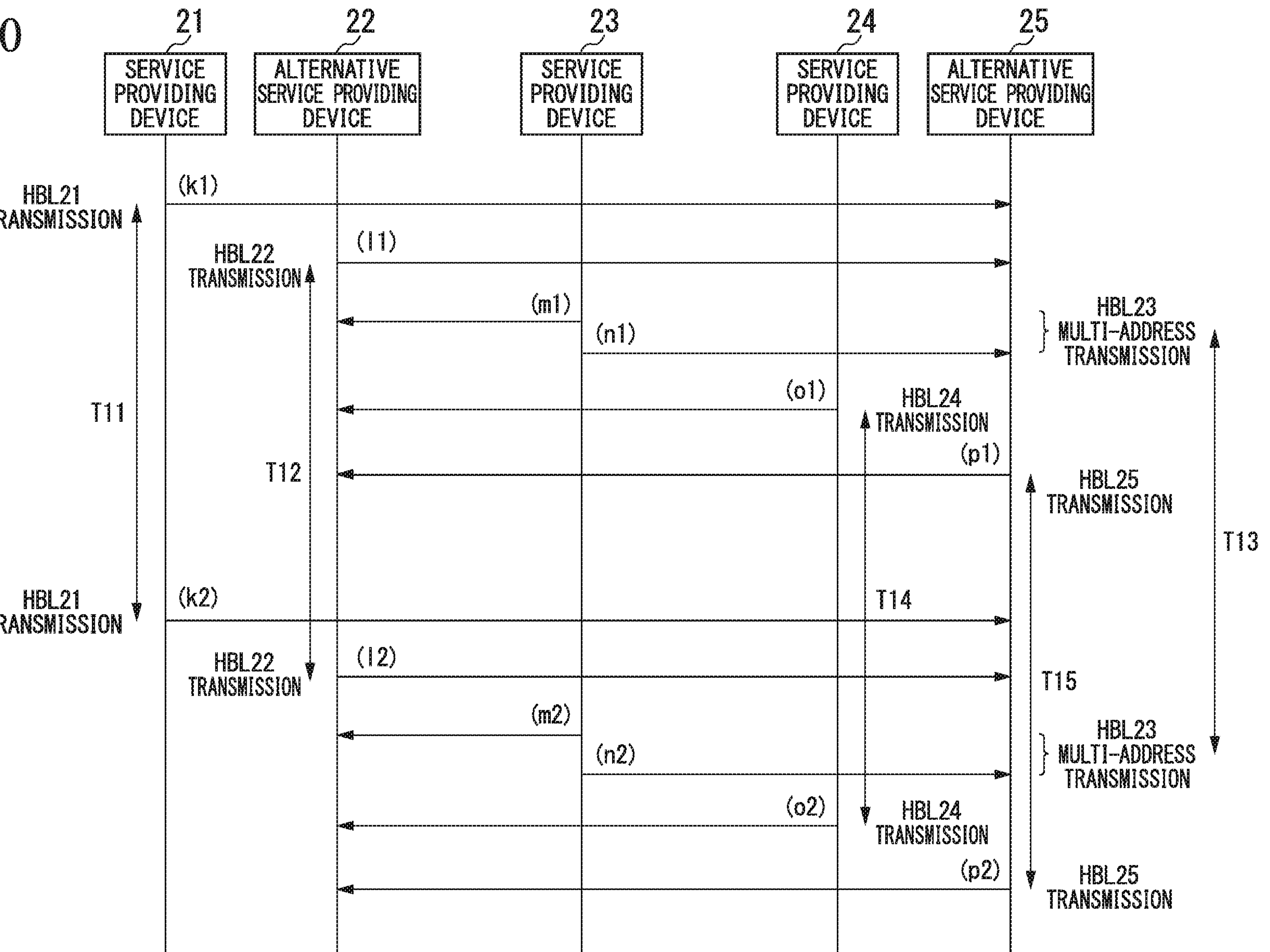
FIG. 10
21
SERVICE PROVIDING DEVICE
22
ALTERNATIVE SERVICE PROVIDING DEVICE
23
SERVICE PROVIDING DEVICE
24
SERVICE PROVIDING DEVICE
25
ALTERNATIVE SERVICE PROVIDING DEVICE
(k1)
HBL21 TRANSMISSION
(l1)
HBL22 TRANSMISSION
(m1)
(n1)
HBL23 MULTI-ADDRESS TRANSMISSION
(o1)
HBL24 TRANSMISSION
T11
T12
(p1)
HBL25 TRANSMISSION
T13
(k2)
HBL21 TRANSMISSION
T14
(l2)
HBL22 TRANSMISSION
T15
(m2)
(n2)
HBL23 MULTI-ADDRESS TRANSMISSION
(o2)
HBL24 TRANSMISSION
(p2)
HBL25 TRANSMISSION

FIG. 12

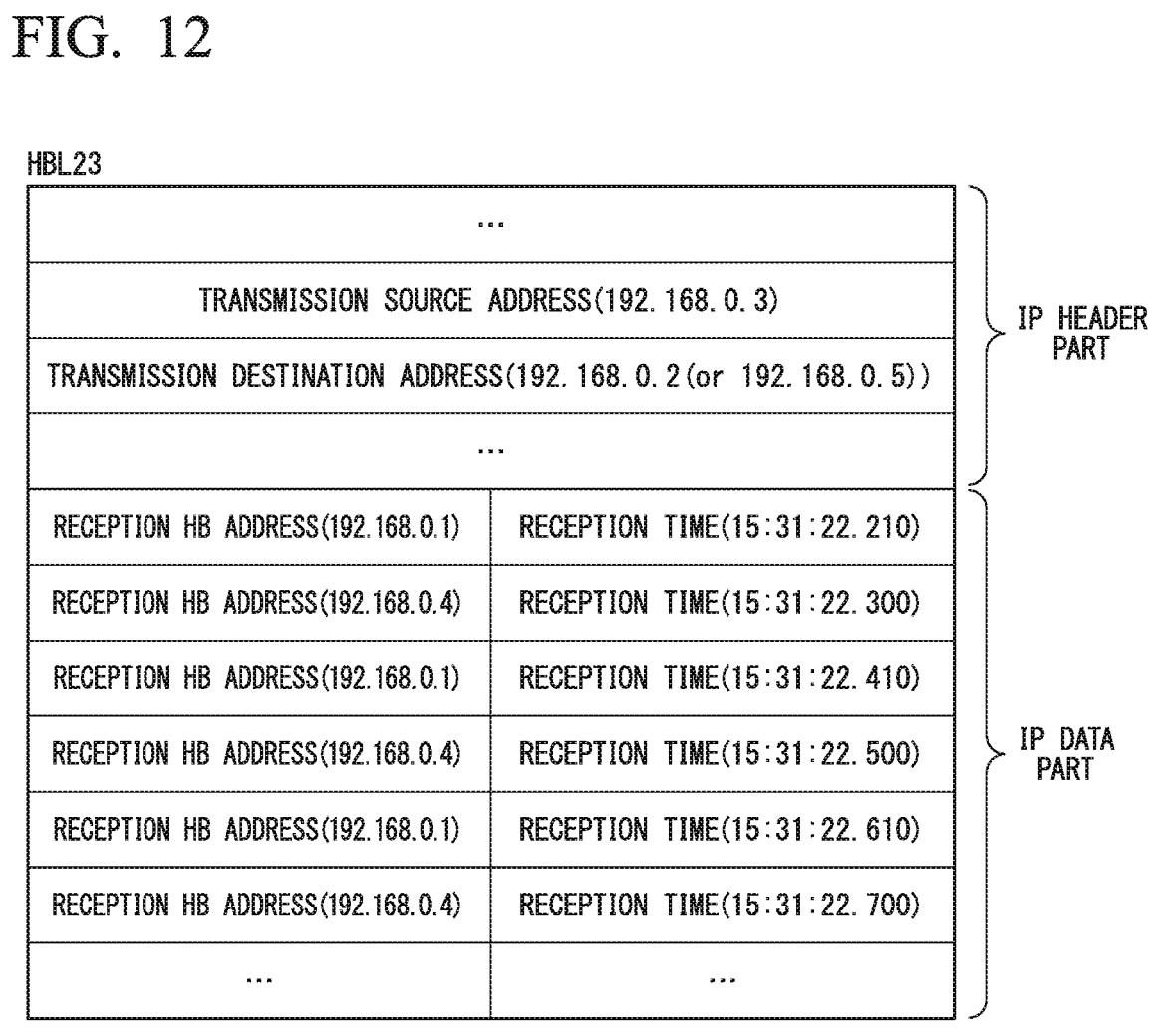

HBL23

| ... | |
|---|---|
| TRANSMISSION SOURCE ADDRESS(192. 168. 0. 3) | |
| TRANSMISSION DESTINATION ADDRESS(192. 168. 0. 2(or 192. 168. 0. 5)) | |
| ... | |
| RECEPTION HB ADDRESS(192.168.0.1) | RECEPTION TIME(15:31:22. 210) |
| RECEPTION HB ADDRESS(192.168.0.4) | RECEPTION TIME(15:31:22. 300) |
| RECEPTION HB ADDRESS(192.168.0.1) | RECEPTION TIME(15:31:22. 410) |
| RECEPTION HB ADDRESS(192.168.0.4) | RECEPTION TIME(15:31:22. 500) |
| RECEPTION HB ADDRESS(192.168.0.1) | RECEPTION TIME(15:31:22. 610) |
| RECEPTION HB ADDRESS(192.168.0.4) | RECEPTION TIME(15:31:22. 700) |
| ... | ... |

IP HEADER PART

IP DATA PART

FIG. 13

HBL25

| | |
|---|---|
| ... | |
| TRANSMISSION SOURCE ADDRESS(192. 168. 0. 5) | |
| TRANSMISSION DESTINATION ADDRESS(192. 168. 0. 2) | |
| ... | |
| RECEPTION HB ADDRESS(192.168.0.1) | RECEPTION TIME(15:31:22. 210) |
| RECEPTION HB ADDRESS(192.168.0.3) | RECEPTION TIME(15:31:22. 225) |
| RECEPTION HB ADDRESS(192.168.0.1) | RECEPTION TIME(15:31:22. 410) |
| RECEPTION HB ADDRESS(192.168.0.3) | RECEPTION TIME(15:31:22. 425) |
| RECEPTION HB ADDRESS(192.168.0.1) | RECEPTION TIME(15:31:22. 610) |
| RECEPTION HB ADDRESS(192.168.0.3) | RECEPTION TIME(15:31:22. 625) |
| ... | ... |

IP HEADER PART

IP DATA PART

SERVICE PROVIDING DEVICE, ALTERNATIVE SERVICE PROVIDING DEVICE, RELAYING DEVICE, SERVICE PROVIDING SYSTEM, AND SERVICE PROVIDING METHOD

BACKGROUND

Technical Fields

The disclosure relates to a service providing device, an alternative service providing device, a relaying device, a service providing system, and a service providing method.

Priority is claimed on Japanese Patent Application No. 2016-092043, filed Apr. 28, 2016, the contents of which are incorporated herein by reference.

Related Art

A distributed control system (DCS) is constructed in a plant and a factory (hereinafter, called simply "plant" as a generic name of them), and an advanced automatic operation is implemented in a production system. In the distributed control system, field devices, such as a measurement device and a manipulation device, and a control device which controls them are connected to each other via communication means. The plant includes a petroleum refining plant, a gas producing/supplying plant, a production plant of chemistry or medicine, a plant controlling to mine a wellhead (for example, a gas field and an oil field) and controlling a transporting pipeline thereof, a power-generating plant (for example, hydro power, thermal power, nuclear power, solar power, and wind power), a monitoring control plant of water supply and sewerage, and so on.

In the system of the plant which is constructed to implement the advanced automatic operation, there is a case where high reliability and real-time property are required. For example, in a control of the plant, such as a process control, a feedback control which feeds back a process result to an input of the process is often used. In the feedback control, when an interruption of the process or a loss of process data occurs, a stability of the control becomes worse.

For this reason, in the control of the plant, in order to improve an availability of the system, there is a case where a redundant system having redundant configuration including a plurality of devices is used. For example, the redundant system is equipped with a regular device used in a normal time and an alternative device used in an abnormal time. When the regular device is in operation, the alternative device is in a wait state (standby state), and the alternative device does not execute the control process. The regular device outputs, at a predetermined time interval, a heartbeat signal for informing that a resource of the regular device is operated normally. The alternative device monitors the heartbeat signal output from the regular device. When the alternative device has detected an abnormality in the heartbeat signal, the alternative device is changed from the standby state to an active state, and the alternative device executes the control process instead of the resource of the regular device which has been abnormal (for example, Japanese Unexamined Patent Application Publication No. 2000-218476 or WO 2015/098589).

However, in the conventional system, if the alternative device has detected the abnormality in the heartbeat signal, and a time lag has occurred when switching a service from the regular device to the alternative device, there is a case where an interruption of the service or a loss of service data occurs, and the service becomes unstable.

For example, even if the resource which provides the service (performs the service) is normal, when an abnormality such as a disconnection of a wiring for transmitting and receiving the heartbeat signal has occurred, the alternative device detects the abnormality of the heart beat signal, and the alternative device changes from the standby state to the active state. For this reason, there is a case where so-called split-brain syndrome (hereinafter, called as "SB") occurs, a data inconsistency caused by duplication of the service occurs in SB, and the service becomes unstable.

SUMMARY

A service providing device included in a process control system in a plant, the service providing device may include a communicator configured to perform communication via a network, a service provider configured to provide a service via the communicator by exclusively assigning first identification information to one of the service providing device and an alternative service providing device, the first identification information being common to the alternative service providing device which provides the service instead of the service providing device, and a heartbeat transmitter configured to transmit heartbeat information for notifying that the service is normal to the alternative service providing device via a relaying device by using second identification information which is different from the first identification information.

Further features and aspects of the present disclosure will become apparent from the following detailed description of exemplary embodiments with reference to the attached drawings.

BRIEF DESCRIPTION OF THE DRAWINGS

FIG. 1 is a drawing illustrating an example of the first configuration of the service providing system in the embodiment.

FIG. 8 is a drawing illustrating an example of the second configuration of the service providing system in the embodiment.

FIG. 10 is a sequence diagram illustrating an example of a transmission operation of the heartbeat list of the relaying device in the embodiment.

FIG. 12 is a drawing illustrating an example of the heartbeat list transmitted from the relaying device in the second configuration of the service providing system in the embodiment.

FIG. 13 is a drawing illustrating an example of the heartbeat list transmitted from the relaying device in the second configuration of the service providing system in the embodiment.

DETAILED DESCRIPTION OF THE EMBODIMENTS

Figure 2:
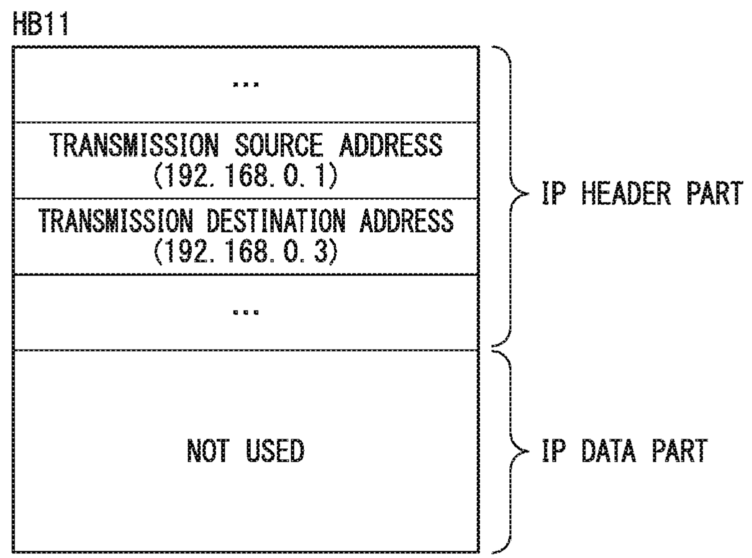
FIG. 2 is a drawing illustrating an example of the heartbeat signal which is to be transmitted from the service providing device in the embodiment.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a service providing device, an alternative service providing device, a relaying device, a service providing system, and a service providing method which can prevent the service from becoming unstable.

Conventional notification of heart beat information is implemented by adding dedicated hardware, for example, extending external bus which connects between boards, and adding an I/F of a special cable. Therefore, it is difficult to implement a redundant configuration by using a general-purpose service providing device without restriction such as a problem of the SB. In the present embodiment, a perfect redundant configuration is implemented with only the general-purpose service providing device, by uniquely combining and utilizing general-purpose network functions of which reliability and real-time property are improved.

Hereinafter, a service providing device, an alternative service providing device, a relaying device, a service providing system, and a service providing method in an embodiment of the present invention will be described in detail, with reference to drawings.

First, a first configuration of the service providing system will be described with reference to FIG. 1. FIG. 1 is a drawing illustrating an example of the first configuration of the service providing system in the embodiment.

In FIG. 1, the service providing device 11, the alternative service providing device 12, and the terminal device 13 (hereinafter, it may be called as "service providing device or the like") are connected to a network, and included in a process control system (DCS). The service providing device performs redundant operation normally, and performs autonomously critical and high-reliable functions such as control. For example, the service providing device is such as a control device and a server-type PC (Personal Computer) performing the redundant operation, but the service providing device may be a control device of another field, such as an FA (Factory Automation) computer and a PLC (Programmable Logic Controller). Further, if high-reliability is not required, the service providing device may be an office computer, such as a desktop PC (Personal computer), a notebook PC, a tablet PC, a PDA (Personal Digital Assistant), or a smart phone. In a case that a field device connected to the service providing device has a control function, the field device may perform a service which is the same as that of the service providing device. For example, the field device is an input device which inputs a signal of physical quantity (pressure, temperature, and so on) of a differential pressure gauge, a thermometer, a flowmeter, and so on, or an output device which outputs a control signal for changing an opening degree of a regulating valve or the like.

The service providing device or the like is equipped with a CPU (Central Processing Unit), a RAM (Random Access Memory), a ROM (Read Only Memory), an HDD (Hard Disk Drive), a display device, an input device such as a keyboard or mouse, which are not illustrated. The CPU executes one or more programs stored in the RAM or the like in order to implement each function of the service providing device 11, the alternative service providing device 12, and the terminal device 13, which will be described below. That is, each function of the service providing device 11, the alternative service providing device 12, and the terminal device 13 is a functional module implemented by software. The one or more programs executed by the service providing device 11, the alternative service providing device 12, or the terminal device 13 may be provided from a server, or may be provided from a recording medium.

The service providing device 11 is a device (active-side device) which provides a service to a device connected via the network. The service providing device 11 is paired with the alternative service providing device 12 (standby-side device) and constitutes a redundant system. In the present embodiment, the service provided by the service providing device (the service performed by the service providing device) may be a service of a monitoring target of heartbeat and a typical control process performed by a controller included in the process control system in the plant. The service provided by the service providing device may be a service of a monitoring target of heartbeat and a general server process such as a daemon system service and a virtual IP services. The service of the monitoring target is a service of operating environment (platform) for executing an OS (Operating System)/application 112 (described later). Specifically, the operating environment is hardware or hypervisor (virtualization). The service of the monitoring target is a service for the operating environment (platform), that is, it monitors whether the operating environment is in operation or not. In addition, there is also a case where the monitoring target is the OS/application. For example, it is a service provided through the network, such as a data process, data storage, a data transmission, a communication service, a web service for a web browser, or the like. In the present embodiment, the device to which the service is provided is called as a utilization device. The terminal device 13 is an example of the utilization device. The service providing device 11 transmits a heartbeat signal (HB11) to the utilization device. The heartbeat signal is an example of heartbeat information including information representing a transmission source of a signal.

The alternative service providing device 12 is a device which performs redundant operation together with the service providing device 11. When an abnormality occurs in the resource of the service providing device 11, the alternative service providing device 12 provides the service instead of the service providing device 11. When the service providing device 11 is in operating normally, the alternative service providing device 12 is in the standby state, and does not provide the service. When the resource of the service providing device 11 has been abnormal, the alternative service providing device 12 is changed from the standby state to the active state, and the alternative service providing device 12 starts to provide the service.

The terminal device 13 is a device other than the service providing device 11 and the alternative service providing device 12 described above, in the devices included in the process control system in the plant, which is connected to the network. For example, the terminal device 13 is a utilization device which utilizes the service provided by the service providing device 11. The terminal device 13 may be a service providing device of a single configuration which does not perform the redundant operation. The terminal device 13 receives the heartbeat signal (HB11) transmitted from the service providing device 11, and generates a heartbeat list (HBL13). The terminal device 13 transmits the generated heartbeat list to the alternative service providing device 12. Like the heartbeat signal, the heartbeat list is also an example of the heartbeat information including information representing a transmission source of a signal. That is, the terminal device 13 may be a device having a relay function for relaying the heartbeat information. An operation monitoring device which constitutes the process control system in the plant together with the controller may have the function of the terminal device 13.

Here, the heartbeat is information necessary for a process (failover process) of monitoring an operation state of the resource of the service providing device 11 which is in the active state, changing the resource of the alternative service providing device 12 from the standby state to the active state when a failure occurs in the resource of the service providing device 11, and continuing the service by using the alternative service providing device 12. The heartbeat can be implemented by a network configuration and one or more programs for continuing the service. As described above, the resource is a hardware resource and a software resource for supplying the service, and it is determined that a function or a service supplied by the service providing device is normal by monitoring that the resource is normal. In the present embodiment, a case where the monitoring target is the operating environment (platform) which executes the OS/application 112 which is an example of the service provider of the service providing device 11 will be described. The heartbeat information is information for notifying that the operating environment which executes the OS/application 112 of the service providing device 11 (or a service thereof) is normal. The heartbeat signal is an example of the heartbeat information. For example, the heartbeat signal is transmitted by the service providing device 11, and the heartbeat signal is transmission data for notifying the operating environment for executing the OS/application 112 (or the service of the OS/application 112) is normal. The heartbeat list is an example of information (hereinafter, called as "relay information") representing that the relaying device has relayed the heartbeat information. For example, the heartbeat list is generated based on the heartbeat signal by the relaying device which has received the heartbeat signal, and the heartbeat list is the transmission data transmitted to the alternative service providing device 12. For example, the most basic configuration of the heartbeat list may be only a transmission source address of the received heartbeat signal.

The service providing device 11 has functions of an NIC (Network Interface Card) 111, the OS/application 112, and an HB (Heartbeat) transmitter 113.

The NIC 111 is an example of a communicator which performs communication via the network 19. The NIC 111 has an address for application communication and an address for HB communication. The address for application communication is an example of first identification information. The address for HB communication is an example of second identification information. The first identification information is identification information for communicating with the OS/application 112 which is an example of a service provider. For example, an IP (Internet Protocol) address, a port number, an application ID (Identification), or the like can be used as the first identification information. The second identification information is identification information for communicating with the HB transmitter 113 which is an example of a heartbeat transmitter. For example, an IP address, a port number, an application ID, or the like can be used as the second identification information.

In the present embodiment, a network number (192.168.1, in a case that subnet mask is 255.255.255.0) is used for an application communication network, and an IP address (192.168.1.1) is used as the address for application communication. Moreover, a network number (192.168.0, in a case that subnet mask is 255.255.255.0) is used for an HB communication network, and an IP address (192.168.0.1) is used as the address for HB communication. The address (192.168.1.1) for application communication is the same as the address (192.168.1.1) for application communication in the alternative service providing device 12. That is, the terminal device 13 which utilizes the address for application communication can utilize the service provided by the OS/application 112 without distinguishing the service providing device 11 from the alternative service providing device 12.

The address (192.168.0.1) for heartbeat communication is an IP address assigned to the service providing device 11, and does not overlap with other devices. Thus, the address for heartbeat communication can be used as information for identifying the service providing device 11.

In the present embodiment, the address for application communication, which is an example of the first identification information, uses the same NIC 111 as the address for HB communication, which is an example of the second identification information. Thus, for example, if a load of communication using the address for application communication is large, there is a case where transmission/reception of IP packets of HB communication using the address for HB communication fails. For example, a priority of HB communication is made higher than a priority of application communication by using priority service specified in IEEE 802.1p, so that failures of HB communication can be reduced even if a load of application communication is large.

The NIC 111 has unique identification information such as a MAC (Media Access Control) address for identifying a node of the service providing device 11 in the network 19. The first identification information and the second identification information are assigned to the same NIC 111, so that availability of the first identification information for the network 19 can be the same as availability of the second identification information for the network 19. For example, if a dropout or disconnection of a LAN cable connected to the NIC 111 or a failure of the NIC 111 have occurred, the first identification information and the second identification information cannot be used (operated) similarly. Thereby, if a heartbeat signal using the second identification information cannot be detected because of the disconnection or the like of the LAN cable, the service cannot be also provided by using the first identification information. Therefore, when the heartbeat signal cannot be detected because of the disconnection or the like of the LAN cable, the SB which occurs in a state that the first identification information is available can be prevented.

The first identification information is common with the address for application communication provided by the alternative service providing device 12. By using the common first identification information, in the redundant configuration of the service providing system 10, the terminal device 13 can use the service provided by the service providing device 11 and the service provided by the alternative service providing device 12 without distinguishing them, the availability of the terminal device 13 can be improved.

The OS/application 112 is an example of a service provider which performs the service to be provided to the terminal device 13 via the NIC 111. For example, the OS/application 112 has an OS section and an application section. In the present embodiment, a case where the OS/application 112 is one resource without distinguishing a service performed by the OS section from a service performed by the application section will be described. The heartbeat of the present embodiment is used for monitoring the operating environment (platform) which executes the OS/application 112. If an abnormality has been detected in the operating environment (platform) which executes the OS/application 112, the OS/application 122 of the alternative service providing device 12 continues the service instead of the OS/application 112 of the service providing device 11.

The HB transmitter 113 monitors the operating environment (platform) which executes the OS/application 112 of the service providing device 11. If no abnormality has been detected in the operating environment (platform) which executes the OS/application 112 of the service providing device 11, the 11B transmitter 113 transmits the heartbeat signal (HB11) via the NIC 111 at predetermined time intervals by using the second identification information. The HB transmitter 113 has a timer inside thereof. The HB transmitter 113 transmits the HB11 when a value of the timer has elapsed for a predetermined time. The HB transmitter 113 transmits the HB11 to the terminal device 13 which is a relaying device. The terminal device 13 transmits, to the alternative service providing device 12, a heartbeat list (HBL13) based on the transmitted heartbeat signal (HB11). In other words, the HB transmitter 113 transmits the heartbeat information to the alternative service providing device 12 via the relaying device. The HB transmitter 113 has a setting file in which a transmission destination (terminal device 13) to which HB11 is to be transmitted is described. The HB transmitter 113 transmits HB11 to the terminal device 13 based on the setting file. For example, the HB transmitter 113 may provide a UI (User Interface) for setting the setting file. The setting file may include information, such as a transmission destination of HB11, a cluster configuration of the redundant configuration, pass phrase, information about a resource of the monitoring target, and so on.

The alternative service providing device 12 has functions of an NIC 121, an OS/application 122, an HB receiver 123, an HB communication state checker 124, and a changer 125.

The configuration of NIC 121 is similar to the configuration of the NIC 111. That is, like the NIC 111, the NIC 121 has an address (192.168.1.1) for application communication and an address (192.168.0.2) for HB communication. The address (192.168.1.1) for application communication is an example of the first identification information. The address (192.168.0.2) for HB communication is an example of the second identification information. The first identification information is identification information for communicating with the OS/application 122, and the IP address can be used as the first identification information. The second identification information is identification information for communicating with the HB transmitter 113, and the IP address can be used as the second identification information.

In the present embodiment, as the address for application communication, the same IP address (192.168.1.1) as the address for application communication in the service providing device 11 is used. Moreover, an IP address (192.136.0.2) is used as the address for HB communication.

The OS/application 122 changes between a standby state and an active state. The OS/application 122 is an example of a service provider which performs the service via the NIC 121 by exclusively assigning the first identification information to one of the service providing device 11 and the alternative service providing device 12. The first identification information is in common with the service providing device 11 when the OS/application 122 is in the active state. When the OS/application 122 is in the active state, the OS/application 122 provides the service to the terminal device 13 by using the address (192.168.1.1) for application communication which is the first identification information of the NIC 121. On the other hand, when the OS/application 122 is in the standby state, the OS/application 122 does not provide the service by using the address (192.168.1.1) for application communication. The dashed line of the OS/application 122 shown in FIG. 1 represents that the OS/application 122 is in the standby state.

The OS/application 122 changes from the standby state to the active state based on instructions from the changer 125. The OS/application 122 changes to the active state in order to continue the service instead of the OS/application 112. The OS/application 122 may change from the active state to the standby state based on instructions from the changer 125, and may change from the active state to the standby state based on a restart of the alternative service providing device 12. That is, the OS/application 122 is started in the standby state at startup.

The HB receiver 123 receives the heartbeat list from the terminal device 13 via the NIC 121 by using the second identification information. The heartbeat List (HBL13) is generated by the terminal device 13, which is the relaying device, based on at least one heartbeat signal (HB11). Details of HBL13 obtained by the NIC 121 will be described later with reference to FIG. 3.

The HB receiver 123 receives the HBL13, and outputs the received HBL13 to the HB communication state checker 124.

The HB communication state checker 124 checks whether the service performed by the service providing device 11 is normal or not based on the heartbeat list (HBL13) received by the HB receiver 123 at predetermined time intervals. The HB communication state checker 124 has a setting file to which the service providing device 11 has been set as a pair of the redundant configuration. The HB communication state checker 124 has a timer inside thereof. When a value of the timer has elapsed for a predetermined time, the HB communication state checker 124 determines whether or not the heartbeat information of the service providing device 11 which is the pair is included in HBL13 which has been received. If the heartbeat information of the service providing device 11 which is the pair is included in the HBL13, the HB communication state checker 124 determines that the service performed by the service providing device 11 is normal. On the other hand, if the heartbeat information of the service providing device 11 which is the pair is not included in the HBL13, the HB communication state checker 124 determines that the service performed by the service providing device 11 is not normal (is abnormal). When the HB communication state checker 124 determines that the service performed by the service providing device 11 is abnormal, the HB communication state checker 124 outputs changing instructions to the changer 125.

When the changer 125 has received the changing instructions from the HB communication state checker 124, the changer 125 performs a service for the OS/application 122 in the alternative service providing device 12 to continue the service. For example, in order to continue the service in the OS/application 112, the changer 125 may analyze a transaction of the service performed by the OS/application 112, and may set parameters necessary for the failover process to the OS/application 122. The changer 125 outputs, to the OS/application 122, instructions for changing it from the standby state to the active state, in order to continue the service.

The terminal device 13 has functions of an NIC 131, an OS/application 132, an HB receiver 133, an HB transmitter 134, and a pair list storage 135.

The configuration of NIC 131 is similar to the configuration of the NIC 111 and the NIC 121. That is, like the NIC 111 and the NIC 121, the NIC 131 has an address (192.168.2.1) for application communication and an address (192.168.0.3) for HB communication. The address (192.168.2.1) for application communication is an example of the first identification information. The address (192.168.0.3) for HB communication is an example of the second identification information. The first identification information is identification information for communicating with the OS/application 132, and the IP address can be used as the first identification information. The second identification information is identification information for communicating with the HB receiver 133 and the HB transmitter 134, and the IP address can be used as the second identification information.

The OS/application 132 uses the service provided by the OS/application 112 of the service providing device 11 and the service provided by the OS/application 122 of the service providing device 12. The OS/application 132 uses the address (192.168.1.1) for application communication which is the first identification information common to the service providing device 11 and the alternative service providing device 12. Thereby, even if the OS/application 112 becomes abnormal, the service provided by the OS/application 122 instead of the OS/application 112 can be used continuously.

The HB receiver 133 is an example of a heartbeat information receiver which receives the HB11 for notifying that the service provided by the service providing device 11 is normal by using the second identification information. The HB receiver 133 receives the HB11 from the service providing device 11 via the NIC 131 by using the second identification information. The HB receiver 133 outputs the received HB11 to the pair list storage 135 when the HB receiver 133 has received the HB11 from the service providing device 11.

The pair list storage 135 stores a pair list representing that the service providing device 11 and the alternative service providing device 12 is a pair of the redundant configuration. The pair list storage 135 determines whether or not the heartbeat information representing the service providing device 11 which is a transmission source included in the HB11 received by the HB receiver 133 exists in the pair list. If the heartbeat information representing the service providing device 11 exists in the pair list, the pair list storage 135 generates the heartbeat list (HBL13) in which the heartbeat information has been listed based on the received heartbeat information. The pair list storage 135 is an example of an information generator which generates relay information based on the received HB11. On the other hand, if the heartbeat information representing the service providing device 11 does not exist in the pair list, the pair list storage 135 ignores the received heart beat signal.

In the present embodiment, the heartbeat list in which the heartbeat information has been listed is used as an example of the relay information. However, the relay information is not limited to information in a list format, and the relay information may be information including the heartbeat information. For example, the relay information may be information for directly relaying the heartbeat signal. The relay information may be information in which the received heartbeat information has been described in a predetermined position of packet data. The relay information may be information including only heartbeat information based on a newest heartbeat signal received from the service providing device 11.

The HB transmitter 134 is an example of a relay information transmitter which transmits the generated HBL13 to the alternative service providing device 12. The HB transmitter 134 has a timer inside thereof. When a value of the timer has elapsed for a predetermined time, the HB transmitter 134 reads the HBL13 generated by the pair list storage 135, and transmits the HBL13 to the alternative service providing device 12. A time interval at which the HB transmitter 134 transmits the HBL13 and a time interval at which the HB transmitter 113 transmits the HB11 can be set arbitrarily. A transmission timing of the heartbeat signal and a transmission timing of the heartbeat list will be described later with reference to FIG. 7.

In FIG. 1, the terminal device 13 may be a device having a relay function of relaying the heartbeat information. For example, the device having the relay function may be a gateway device such as a router connected to the network. The gateway device is a device which connects different networks (segments) to each other. If the terminal device 13 is a gateway device, the gateway device can restrict the relayed heartbeat information from being transmitted via the gateway device. If the gateway device restricts the heartbeat information from being transmitted via the gateway device, the gateway device can relay the heartbeat information only in the same segment. For example, if a number of service providing devices or the like connected to the network increases, a number of packets of the heartbeat information also increases. The gateway device does not relay heartbeat information of another network. Thereby, the gateway device can make the heartbeat information be transmitted and received in the same segment. For this reason, a load of the network can be reduced. For example, if a plurality of devices is connected via the network in the plant, the gateway device separates segments in order to make the number of packets of the heartbeat information appropriate.

If the gateway device such as a router has a relay function for relaying the heartbeat information, specifically, the gateway device performs operation and has configuration as described below. For example, the service providing device 11 sets the IP address of the alternative service providing device 12 to the transmission destination address in the packet of the heartbeat information, and the service providing device 11 sets the IP address of the service providing device 11 to the transmission source address. Moreover, the service providing device 11 performs unicast communication without data to the gateway device such as a router having the function. At this time, based on an IP routing table held by the service providing device 11, the service providing device 11 determines whether or not the transmission destination address is the IP address of the alternative service providing device 12. If the transmission destination address is the IP address of the alternative service providing device 12, the service providing device 11 transmits the packet of the heartbeat information directly to a designated router (a gateway device such as a router having the relay function of relaying the heartbeat information). For example, "transmission destination address: IP address of the alternative service providing device 12" and "router of transmission destination: IP address of the router to which the heartbeat information is relayed" may be set to the IP routing table of the service providing device 11. The router designated by the service providing device 11 (a gateway device such as a router having the relay function of relaying the heartbeat information) do not require a special network setting. The router receives a packet of the heartbeat information transmitted from the service providing device 11. Since the destination of the packet is the IP address of the alternative service providing device 12, the router recognizes that the destination of the packet is a communication partner which can be routed by the network such as Ethernet (registered trademark). Thereafter, the router transmits the packet to the alternative service providing device 12 via an Ethernet card. In other words, the router (a gateway device such as a router having the relay function of relaying the heartbeat information) designated by the service providing device 11 relays the heartbeat information in accordance with the relay function of the heartbeat information without a special network setting.

If the router (a gateway device such as a router having the relay function of relaying the heartbeat information) is used, a communication path of the heartbeat information for transmitting the heartbeat information of the service providing device 11 to a communication partner in a different segment beyond the router, and thereafter transmitting the heartbeat information to the alternative service providing device 12, may be unnecessary. It is because a communication load increases if the communication path of the heartbeat information is used.

By the operation and the configuration described above, the router (a gateway device such as a router having the relay function of relaying the heartbeat information) designated by the service providing device 11 transmits the heartbeat information of the service providing device 11 to the alternative service providing device 12 (without transmitting the heartbeat information beyond the router to a router in another segment). Thereby, since it is only necessary to monitor the communication path of the heartbeat information, a load of communication can be reduced.

If the communication path of the heartbeat information in the same segment has been disconnected, a communication path for transmitting the heartbeat information to a communication partner in a different segment and thereafter transmitting the heartbeat information to the alternative service providing device 12 may be disconnected. Therefore, the configuration for transmitting the heartbeat information from the router to the different segment may be unnecessary.

Therefore, the configuration of the present embodiment can reduce the load of network communication, and can prevent the service of the entire system from becoming unstable.

In FIG. 1, a case that functions of the service providing device 11, the alternative service providing device 12, and the terminal device 13 are implemented by software has been described. However, one or more functions of the service providing device 11, the alternative service providing device 12, and the terminal device 13 may be implemented by hardware. The functions of the service providing device 11, the alternative service providing device 12, and the terminal device 13 may be implemented by dividing one function to a plurality of functions. The functions of the service providing device 11, the alternative service providing device 12, and the terminal device 13 may be implemented by combining two or more functions into one function.

The explanation of the first configuration of the service providing system shown in FIG. 1 is ended.

Next, the heartbeat signal described in FIG. 1, which is transmitted from the HB transmitter 113 of the service providing device 11 to the HB receiver 133 of the terminal device 13, will be described with reference to FIG. 2. FIG. 2 is a drawing illustrating an example of the heartbeat signal which is to be transmitted from the service providing device in the embodiment.

In FIG. 2, the HB11 illustrated as the heartbeat signal represents an IP packet which has an IP header part and an IP data part. The IP header part of the HB11 includes a transmission source address and a transmission destination address of a packet. As the transmission source address, an IP address (192.168.0.1) which is an address for HB communication of the service providing device 11 is used. As the transmission destination address, an IP address (192.168.0.3) which is an address for HB communication of the terminal device 13 is used. In the present embodiment, the transmission source address of the HB11 is used as a transmission source of the heartbeat signal. Thereby, it is not necessary to input data to the IP data part, and a load of transmitting and receiving packets can be reduced.

In FIG. 2, since the heartbeat signal is transmitted only to the terminal device 13, unicast for describing the IP address of the terminal device 13 in the transmission destination address is used when the heartbeat signal is transmitted. However, if there are two or more transmission destinations of the heartbeat signal, multicast or broadcast may be used when the heartbeat signal is transmitted.

The explanation of the heartbeat signal shown in FIG. 2 which is to be transmitted from the HB transmitter 113 is ended.

Figure 3:
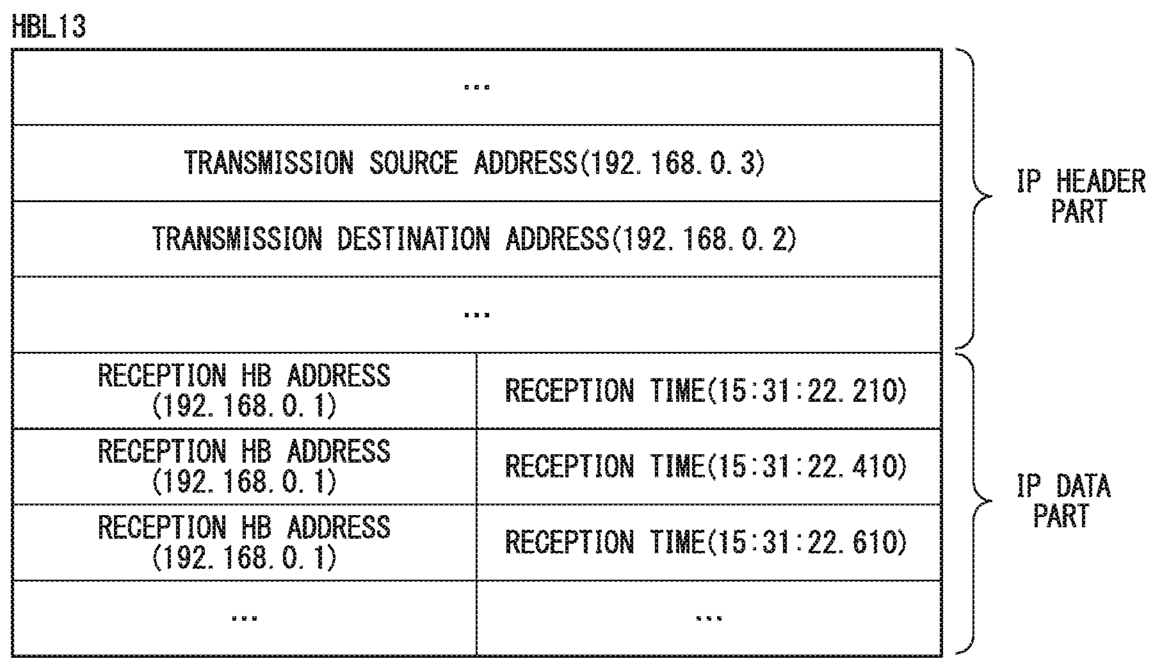
FIG. 3 is a drawing illustrating an example of the heartbeat list transmitted from the relaying device in the embodiment.

Next, the heartbeat list described in FIG. 1, which is transmitted from the HB transmitter 134 of the terminal device 13 to the HB receiver 123 of the alternative service providing device 12, will be described with reference to FIG. 3. FIG. 3 is a drawing illustrating an example of the heartbeat list transmitted from the relaying device in the embodiment.

In FIG. 3, the HB13 illustrated as the heartbeat list represents an IP packet having an IP header part and an IP data part. The HBL13 is generated by the pair list storage 135 based on the received HB11.

The IP header part of the HBL13 includes a transmission source address and a transmission destination address of a packet. As the transmission source address, an IP address (192.168.0.3) which is an address for HB communication of the terminal device 13 is used. As the transmission destination address, an IP address (192.168.0.2) which is an address for HB communication of the alternative service providing device 12 is used.

The pair list storage 135 records the IP address (192.168.0.1), which is a transmission source address of the HB11 described in FIG. 2, as a reception HB address. The pair list storage 135 records each of reception times of HB11 in the HBL13. FIG. 3 represents that three receptions of the HB11 are recorded every 0.2 seconds from the reception time 15:31:22.210. In other words, FIG. 3 represents that the HB11 is transmitted every 0.2 seconds, whereas the HBL13 is transmitted every 0.6 seconds which is at least three cycles thereof. Since the HBL13 includes the heartbeat information of three cycles, the number of packet transmission times of the heartbeat list can be reduced to ⅓.

Although the transmission timing of the HBL13 is arbitrary, the load of packet transmission in the network is increased if the transmission interval of the HBL13 becomes shorter. On the other hand, the load of packet transmission in the network is decreased if the transmission interval of the HBL13 becomes longer. However, it is desirable that the transmission interval of the HBL13 is shorter than the time required for the alternative service providing device 12 to provide the service continuously. For example, if the transmission interval of the HBL13 is long, timing of failover is delayed, and the service cannot be provided continuously.

The explanation of the heartbeat list shown in FIG. 3 transmitted from the HB transmitter 134 is ended.

Figure 4:
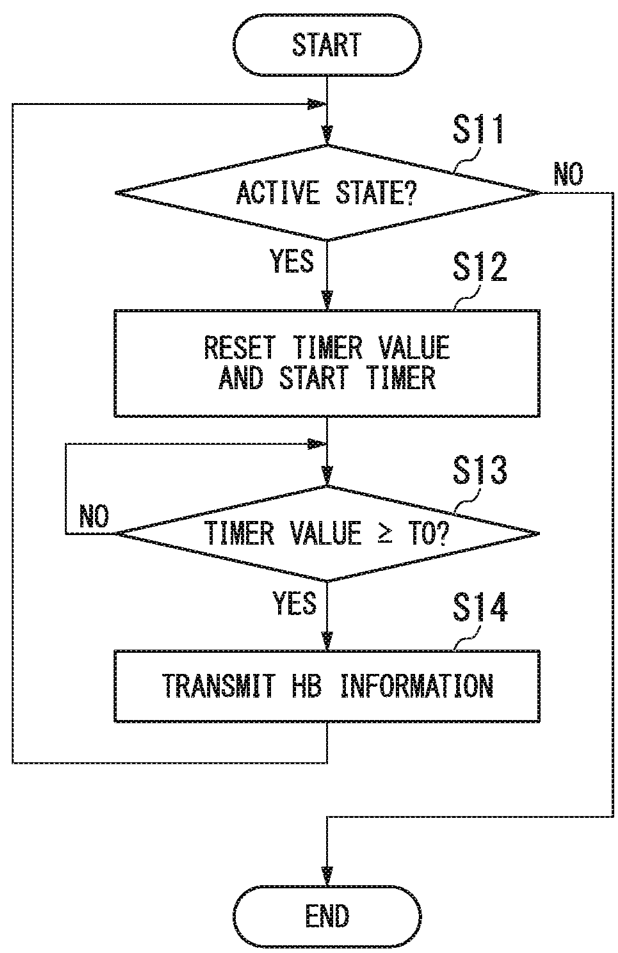
FIG. 4 is a flowchart illustrating an example of the operation of the service providing device in the embodiment.

Next, an operation of the service providing device which transmits the heartbeat signal will be described with reference to FIG. 4. FIG. 4 is a flowchart illustrating an example of the operation of the service providing device in the embodiment. The service providing device described in FIG. 4 is a device having a resource of a monitoring target of heartbeat, and the service providing device performs the redundant operation together with the alternative service providing device.

In FIG. 4, the service providing device determines whether the service providing device is in the active state or not (step S11). For example, the service providing device can determine whether the service providing device is in the active state or not based on whether a response has been received from the resource of the monitoring target within a predetermined time. If the service providing device (self-device) is not in the active state (if the service providing device is in the standby state) (step S11: NO), the service providing device ends the process of the flowchart of FIG. 4.

On the other hand, if the service providing device (self-device) is in the active state (step S11: YES), the service providing device resets the timer value and starts the timer (step S12). After the process in step S12 has been executed, the service providing device determines whether the timer value is equal to or more than T0 or not (step S13). If the timer value is not equal to or more than T0 (step S13: NO), the service providing device repeats the process in step S13. On the other hand, if the timer value is equal to or more than T0 (Step S13: YES), the service providing device transmits the heartbeat signal as the HB information. After the process in step S14 has been executed, the service providing device executes the process in step S11 again.

Therefore, if the service providing device is in the active state, the service providing device continues to transmit the heartbeat signal at a period T0.

The explanation of the operation shown in FIG. 4 of the service providing device which transmits the heartbeat signal is ended.

Figure 5:
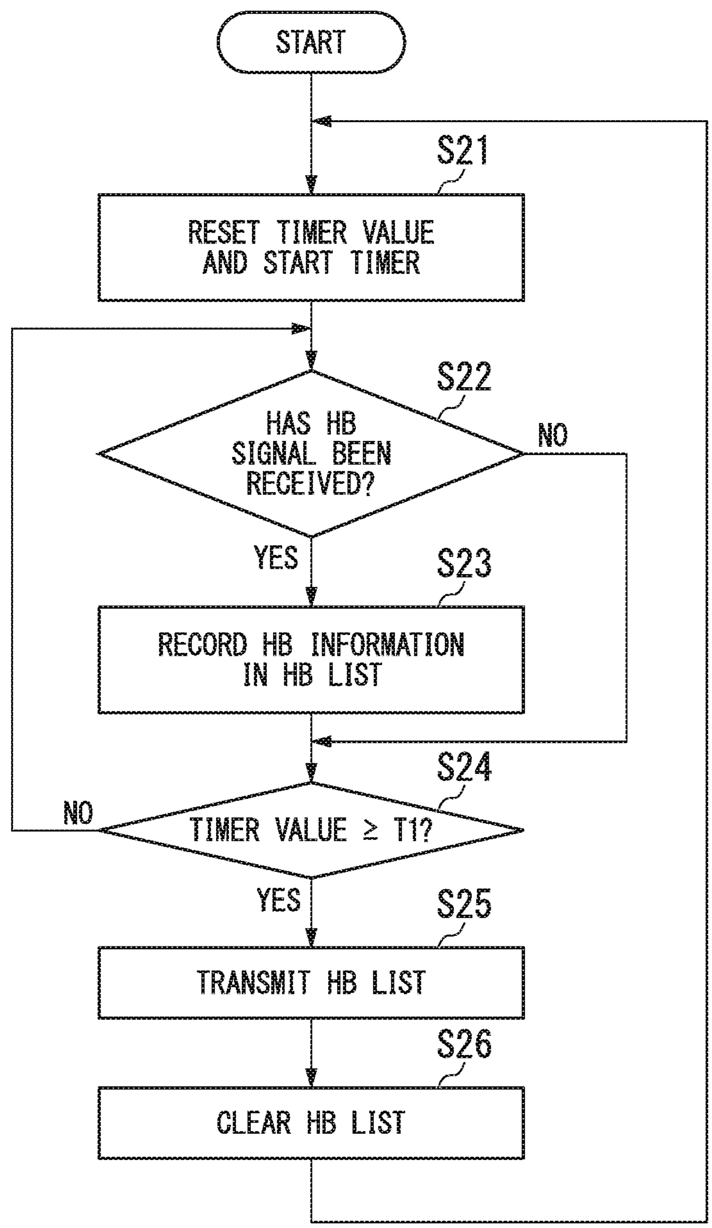
FIG. 5 is a flowchart illustrating an example of the operation of the relaying device in the embodiment.

Next, an operation of the relaying device will be described with reference to FIG. 5. FIG. 5 is a flowchart illustrating an example of the operation of the relaying device in the embodiment. The relaying device described in FIG. 5 is a device which receives the heartbeat signal and transmits relay information. Specifically, the relaying device may be a service providing device and/or an alternative service providing device performing the service instead of the service providing device, which provides the service for redundant configuration.

In FIG. 5, the relaying device resets the timer value, and starts the timer (step S21). After the process in step S21 has been executed, the relaying device determines whether the heartbeat signal has been received or not (step S22). For example, the relaying device can determine whether the heartbeat signal has been received or not based on whether or not the address for HB communication of the self-device is included in the transmission destination address of the IP packet (including a case of broadcast transmission). If the relaying device has determined that the heartbeat signal has been received (step S22: YES), the relaying device generates a heartbeat list, and the relaying device records, in the heartbeat list, the heartbeat information based on the received heartbeat signal (step S23). On the other hand, if the relaying device has determined that the heartbeat signal has not been received (step S22: NO), the relaying device skips the process in step S23.

After the process in step S23 has been executed, or if the relaying device has determined that the heartbeat signal has not been received in Step S22, the relaying device determines whether the timer value is equal to or more than T1 (step S24). If the relaying device has determined that the timer value is not equal to or more than T1 (Step S24: NO), the relaying device executes the process in step S22. On the other hand, if the timer value is equal to or more than T1 (Step S24: YES), the relaying device transmits the heartbeat list to the alternative service providing device (step S25). After the step S25 has been executed, the relaying device clears (or deletes) the heartbeat list (step S26). After the process in step S26 has been executed, the relaying device executes the process in step S21 again.

Therefore, the relaying device generates the heartbeat list based on the heartbeat information of the heartbeat signal received within the time T1, and the relaying device transmits the generated heartbeat list to the alternative service providing device.

The explanation of the operation shown in FIG. 5 of the relaying device is ended.

Figure 6:
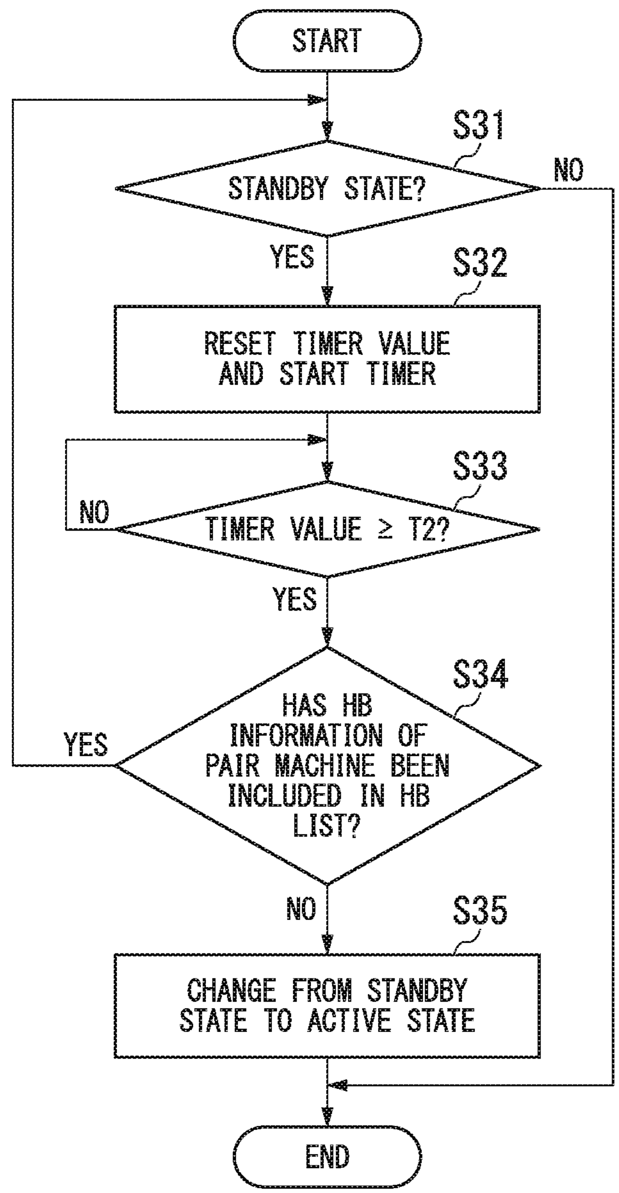
FIG. 6 is a flowchart illustrating an example of the operation of the alternative service providing device in the embodiment.

Next, an operation of the alternative service providing device will be described with reference to FIG. 6. FIG. 6 is a flowchart illustrating an example of the operation of the alternative service providing device in the embodiment. The alternative service providing device described in FIG. 6 is a device which performs the service instead of the service providing device, and the alternative service providing device may be a relaying device.

In FIG. 6, the alternative service providing device determines whether the alternative service providing device is in the standby state or not (step S31). For example, the alternative service providing device can determine whether the alternative service providing device is in the standby state or not based on a changing state of itself. If the alternative service providing device is not in the standby state (if the alternative service providing device is in the active state)

(step S31: NO), the alternative service providing device ends the process of the flowchart of FIG. 6.

On the other hand, if the alternative service providing device is in the standby state (Step S31: YES), the alternative service providing device resets the timer value and starts the timer (step S32). After the process in step S32 has been executed, the alternative service providing device determines whether the timer value is equal to or more than T2 or not (step S33). If the timer value is not equal to or more than T2 (step S33: NO), the alternative service providing device repeats the process in step S33.

On the other hand, if the timer value is equal to or more than "T12 (step S33: YES), the alternative service providing device determines whether or not the heartbeat information of" the service providing device which is a pair of the redundant configuration (hereinafter, called as a pair-service providing device) is included in the received heartbeat (step S34). The alternative service providing device has received the heartbeat list from the relaying device described in FIG. 5 at a time interval T1. For example, the alternative service providing device can determine based on whether or not the heartbeat information of the pair-service providing device is included in any one of heartbeat lists received at the time interval T1 in the period of time T2.

If the alternative service providing device has determined that the heartbeat information of the pair-service providing device is included in the received heartbeat list (Step S34: YES), the alternative service providing device executes the process in step S31 again. On the other hand, if the alternative service providing device has determined that the heartbeat information of the pair-service providing device is not included in the received heartbeat list (Step S34: NO), the alternative service providing device changes from the standby state to the active state in order to perform the service instead of the service providing device (step S35). After the process in step S35 has been executed, the alternative service providing device ends the process of the flowchart of FIG. 6.

Therefore, if the alternative service providing device cannot receive the heartbeat information of the pair-service providing device within the time T12, the alternative service providing device performs the failover process to perform the service instead of the service providing device.

The explanation of the operation shown in FIG. 6 of the alternative service providing device is ended.

In FIG. 4 to FIG. 6, as described above, the functions of the service providing device, the relaying device, and alternative service providing device are separated, but these functions may be executed in the same device. These functions may also be distributed to be executed in the same service providing system. For example, the service providing system has a service providing device and an alternative service providing device which are included in a process control system in a plant. The service providing system has a service provider, a heartbeat transmitter, an information generator, a state checker, and an alternative service provider. The service provider performs a service via a communicator by exclusively assigning the first identification information to one of the service providing device and the alternative service providing device. The first identification information is common to the alternative service providing device which performs the service instead of the service providing device. The heartbeat transmitter transmits heartbeat information for notifying that the service is normal to the alternative service providing device via the communicator by using second identification information which is different from the first identification information. The information generator generates relay information based on the heartbeat information transmitted from the heartbeat transmitter. The state checker checks whether the service is normal or not based on the relay information generated by the information generator. The alternative service provider changes from a standby state to an active state and performs the service instead of the service providing device if the state checker has checked that the service is not normal. Moreover, a multi-address transmission of the heartbeat list is performed at a constant period instead of transmitting the heartbeat information from the pair-service providing device. Furthermore, in a case of a device of redundant configuration which is in the active state, the device transmits the heartbeat list at a time of transmitting the heartbeat signal itself. Thereby, even if a number of service providing devices connected to the network increases, it can be suppressed from increasing a number of packets in the network.

Figure 7A:
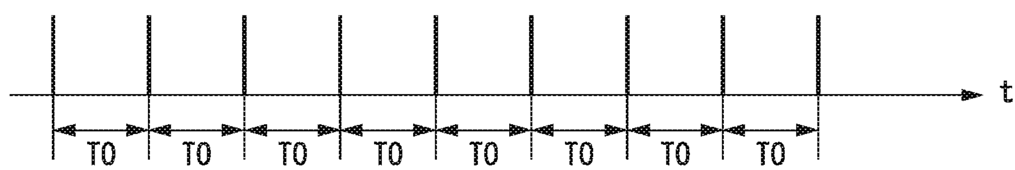
FIG. 7A is a time chart showing an example of the transmission timing of the heartbeat signal transmitted from the service providing device in the embodiment.
Figure 7B:
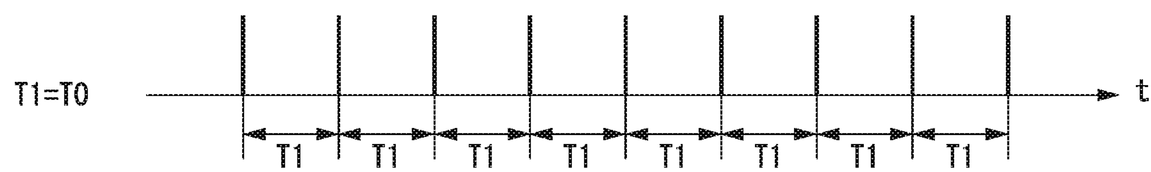
FIG. 7B is a time chart showing an example of the transmission timing of the heartbeat list transmitted from the relaying device in the embodiment.
Figure 7C:
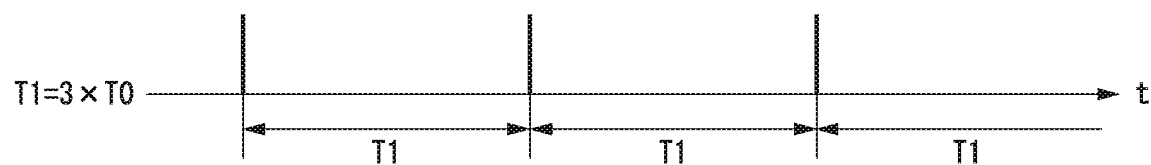
FIG. 7C is a time chart showing another example of the transmission timing of the heartbeat list transmitted from the relaying device in the embodiment.

Next, a transmission timing of the heartbeat signal from the service providing device and a transmission timing of the heart beat list from the relaying device will be described with reference to FIG. 7A to FIG. 7C. FIG. 7A to FIG. 7C represent a time chart showing an example of the transmission timing of the heartbeat signal transmitted from the service providing device and a time chart showing an example of the transmission timing of the heartbeat list transmitted from the relaying device in the embodiment.

FIG. 7A represents the transmission timing of the heartbeat signal transmitted from the service providing device. The service providing device outputs the heartbeat signal to the relaying device at a time interval (period) T0.

FIG. 7B and FIG. 7C represent the transmission timing of the heartbeat list which is an example of the relay information transmitted from the relaying device. In FIG. 7B, the relaying device outputs the heartbeat list to the alternative service providing device at a time interval (period) T1. Here, since T1=T0, heartbeat information based on a reception of one heartbeat signal is included in each heartbeat list.

FIG. 7C represents the transmission timing of the heartbeat list to be transmitted from the relaying device in a case that the period of transmitting the heartbeat list is represented that T1=3×T0. In a case that T1=3×T0, heartbeat information based on a reception of three heartbeat signals is included in each heartbeat list. That is, the number of packets for transmitting the heartbeat list in FIG. 7C becomes ⅓ of the number of packets for transmitting the heartbeat list in FIG. 7B. For this reason, in a case of the timing chart shown in FIG. 7C, a load of the network can be reduced. In other words, a transmission cycle of the relay information is made longer than a transmission cycle of the heartbeat information so that the load of the network can be reduced.

Each of the period T0 of transmitting the heartbeat signal and the period T1 of transmitting the heartbeat list can be set arbitrarily. In the heartbeat communication, the same NIC and the same network as the application communication is used. For this reason, if the period T0 and the period T1 are made short, the application communication is affected. Therefore, it is desirable that the period T0 and the period T1 are set in accordance with the load of the application communication. For example, the period T0 and the period T1 may be automatically changed in accordance with the load of the application communication. In the period T0 and the period T1, the relaying device may transmit the heartbeat signal at the same timing (with the heartbeat list stored in the data part of the heartbeat signal). The relaying device may store heartbeat lists of n cycles in the data part of the heartbeat signal every n cycles of T0, and may transmit the heartbeat signal.

Next, a second configuration of the service providing system will be described with reference to FIG. 8. FIG. 8 is a drawing illustrating an example of the second configuration of the service providing system in the embodiment. In the second configuration of the service providing system shown in FIG. 8, the number of service providing devices and the number of alternative service providing devices connected to the network are increased, as compared with the first configuration of the service providing system shown in FIG. 1. FIG. 8 is a drawing for explaining that a number and a length of packets of the heart beat signal and the heartbeat list are increased cumulatively if the number of service providing devices and the number of alternative service providing devices are increased.

In FIG. 8, the service providing system 20 includes a service providing device 21, an alternative service providing device 22, a service providing device 23, a service providing device 24, and an alternative service providing device 25. The configuration of the service providing device 21, the alternative service providing device 22, the service providing device 23, the service providing device 24, and the alternative service providing device 25 is the same as that of the service providing device 11 and the alternative service providing device 12 described in FIG. 1. In addition, the explanation of the service providing device or the like described in FIG. 1 is the same as that in FIG. 8. For this reason, descriptions of the configuration of each device will be omitted.

The alternative service providing device 22 is a pair of the redundant configuration which performs the service instead of the service providing device 21. The alternative service providing device 25 is a pair of the redundant configuration which performs the service instead of the service providing device 24. The service providing device 23 is a service providing device which performs a single operation. As the service providing device which performs the single operation, there are a device of a single configuration which does not perform the redundant operation and a device which performs the redundant operation but an alternative service providing device does not perform the service instead of the device. Operation of transmitting and receiving the heartbeat information by the service providing device 23 which performs the single operation is the same as the description of the terminal device 13 shown in FIG. 1. For this reason, in FIG. 8, a case where the service providing device 23 performs the single operation by the redundant configuration will be described.

In the service providing system 20, the service providing device 21, the service providing device 23, and the service providing device 24 provide the service. That is, the service providing device 21, the service providing device 23, and the service providing device 24 transmit the heartbeat signal for notifying that the provided service is normal. In the present embodiment, the service providing device 23 of the single configuration has an alternative service providing device (not illustrated). However, since the service providing device 23 is not registered to the alternative service providing device as a pair, the service providing device 23 performs the single operation. In the present embodiment, it can be set easily to the alternative service providing device whether to make the service providing device perform the single operation or perform the redundant operation. Even if the device is of the single configuration which does not perform the redundant operation, in a case that the device continues to output the heartbeat signal, and thereafter a (pre-configured) device which knows the heartbeat information of the device is connected to the network, the device can perform the redundant operation. Thereby, a construction such as interconnection of a communication path dedicated for the heartbeat communication is not required, even a device which is disposed at a physically remote place can perform the redundant operation easily. In addition, such a configuration has a special effect in a case that an inexpensive device of the single configuration is used at a time of introducing the process control system, and the redundant configuration is added after the process control system has been introduced.

In a case that a device of the single configuration which does not perform the redundant operation is used, if the device continues to output the heartbeat signal, the output heartbeat signal can be used for restoring the redundancy automatically.

The service providing device 21 and the service providing device 24 are service providing devices which provide the service to a device connected to the network, and are relaying devices which relay the heartbeat information of other service providing devices.

As compared with the service providing device 11 described in FIG. 1, the service providing device 21 further includes an HB receiver 213, an information list generator 214, and pair list storage 215. The information list generator 214 is a functional block corresponding to the function for generating the heartbeat list, out of the functions described in the pair list storage 135 described in FIG. 1. The HB receiver 213 operates based on the same IP address (192.168.0.1) as the HB transmitter 216.

The HB transmitter 216 transmits the heartbeat information HB21 to the service providing device 23, the service providing device 24, and the alternative service providing device 25, which operate as the relaying device. That is, the transmission destinations of the HB21 transmitted from the service providing device 21 are devices other than the alternative service providing device 22 which is a pair of the redundant configuration. The service providing device 23, the service providing device 24, and the alternative service providing device 25 have an HB receiver for receiving the heartbeat signal which is to be transmitted.

The HB receiver 213 receives the heartbeat signal of the service providing device 23 and the service providing device 24 other than the service providing device 21 (self-device). The information list generator 214 generates a heartbeat list based on the heartbeat signal of the service providing device 23 and the service providing device 24 which have been received. The HB transmitter 216 transmits the generated heartbeat list to the alternative service providing device 25 which is a pair of the other redundant configuration.

That is, the service providing device transmits the heartbeat signal of the self-device, receives the heartbeat signal transmitted from another service providing device, and transmits the heartbeat list to the alternative service providing device. For this reason, in the network to which two or more service providing devices are connected, there is a case where the number of packets is increased because of transmission of the heartbeat signal and the heartbeat list, and the load of the packet transmission is increased.

Therefore, the service providing device transmits the heartbeat signal of the self-device by using the same packet as the heartbeat list based on the heartbeat signal transmitted from another service providing device. By transmitting the heartbeat signal of the self-device by using the same packet as the heartbeat list based on the heartbeat signal transmitted from the other service providing device, the number of packets to be transmitted can be reduced. The heartbeat list to be transmitted by using the same packet as the heartbeat signal is a list based on the heartbeat signal of the other device, which has been received within a transmission period of the heartbeat signal. That is, heartbeat lists are stored in the transmission period of the heartbeat signal, and the heartbeat lists are transmitted together.

The explanation of the second configuration of the service providing system shown in FIG. 8 is ended.

Figure 9:
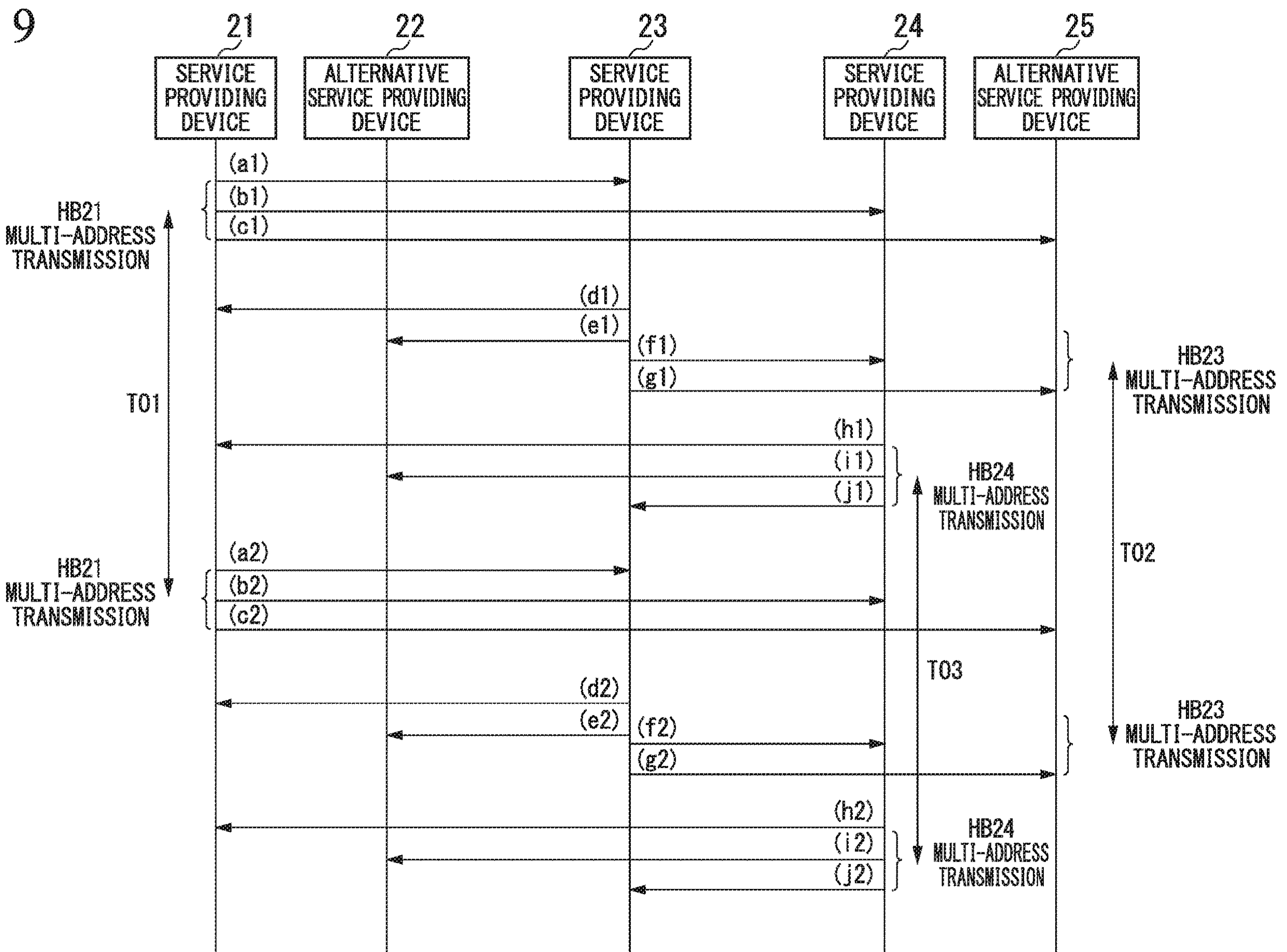
FIG. 9 is a sequence diagram illustrating an example of a transmission operation of the heartbeat signal of the service providing device in the embodiment.

Next, transmission operations of the heartbeat signal and the heartbeat list in the second configuration of the service providing system described in FIG. 8 will be described with reference to FIG. 9 and FIG. 10. FIG. 9 is a sequence diagram illustrating an example of a transmission operation of the heartbeat signal of the service providing device in the embodiment. FIG. 10 is a sequence diagram illustrating an example of a transmission operation of the heartbeat list of the relaying device in the embodiment.

In FIG. 9, (a) to (c) are heartbeat signals transmitted from the service providing device 21. The service providing device 21 transmits the HB21 to the service providing device 23, the service providing device 24, and the alternative service providing device by multi-address transmission (a1) to (c1). The multi-address transmission is such as a multicast or broadcast in IP communication. In a case of broadcast, packet data is to be transmitted to all the devices actually. However, in FIG. 9, only the transmission to the relaying device which relays the heartbeat information is illustrated.

The service providing device 21 transmits the heartbeat signal at a period T01. When the time T01 has been elapsed, the service providing device 21 transmits the HB21 to the service providing device 23, the service providing device 24, and the alternative service providing device 25 by multi-address transmission (a2) to (c2).

In FIG. 9, (d) to (g) are heartbeat signals transmitted from the service providing device 23. The service providing device 23 transmits the HB23 to the alternative service providing device 22, the service providing device 24, and the alternative service providing device 25 by multi-address transmission (d1) to (g1). The service providing device 23 transmits the heartbeat signal at a period T02. When the time T02 has been elapsed, the service providing device 23 transmits the HB23 to the service providing device 21, the alternative service providing device 22, the service providing device 24, and the alternative service providing device 25 by multi-address transmission (d2) to (g2).

In FIG. 9, (h) to (j) are heartbeat signals transmitted from the service providing device 24. The service providing device 24 transmits the HB24 to the service providing device 21, the alternative service providing device 22, and the service providing device 23 by multi-address transmission (h1) to (j1). The service providing device 24 transmits the heartbeat signal at a period T03. When the time T103 has been elapsed, the service providing device 24 transmits the HB24 to the service providing device 21, the alternative service providing device 22, and the service providing device 23 by multi-address transmission (h2) to (j2).

Here, each of the period T01, the period T02, and the period T03 can be set arbitrarily. That is, since each of the service providing devices transmits the heartbeat signal asynchronously, as shown in FIG. 7B, if the transmission period of the heartbeat list is almost the same as the transmission period of the heartbeat signal, a load of the transmission processing of the heartbeat signal may be concentrated. For this reason, the transmission period of the heartbeat list is set to be longer than the transmission period of the heartbeat signal in order to reduce the number of packets to be transmitted, and reduce the load of the network.

In FIG. 10, (k) to (p) are heartbeat lists (relay information) transmitted from the service providing device 21, the alternative service providing device 22, the service providing device 23, the service providing device 24, and the alternative service providing device 25. The multi-address transmission is the same as FIG. 9.

The service providing device 21 transmits the heartbeat lists in a period T11. Similarly, the alternative service providing device 22, the service providing device 23, the service providing device 24, and the alternative service providing device 25 transmit heartbeat lists in periods T12, T13, T14, and T15 respectively.

The service providing device 21, the service providing device 23, and the service providing device 24, which transmit the heartbeat signal of the self-device, may transmit the heartbeat signal with the heartbeat list added in the packet of the heartbeat signal. In this case, the transmission period of the heartbeat list becomes the transmission period of the heartbeat signal described in FIG. 9.

The explanation of the operations of the heartbeat signal and the heartbeat list in the second configuration of the service providing system shown in FIG. 9 and FIG. 10 is ended.

Figure 11A:
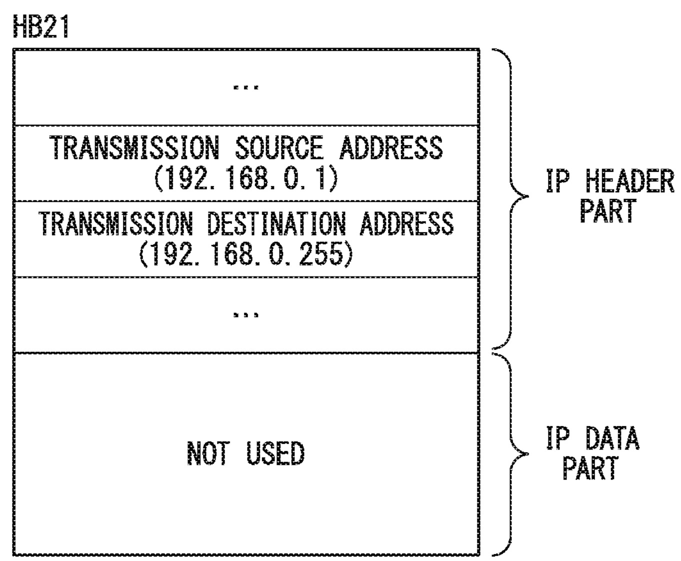
FIG. 11A is a drawing illustrating an example of the heartbeat signal transmitted by broadcast from the service providing device in the second configuration of the service providing system in the embodiment.
Figure 11B:
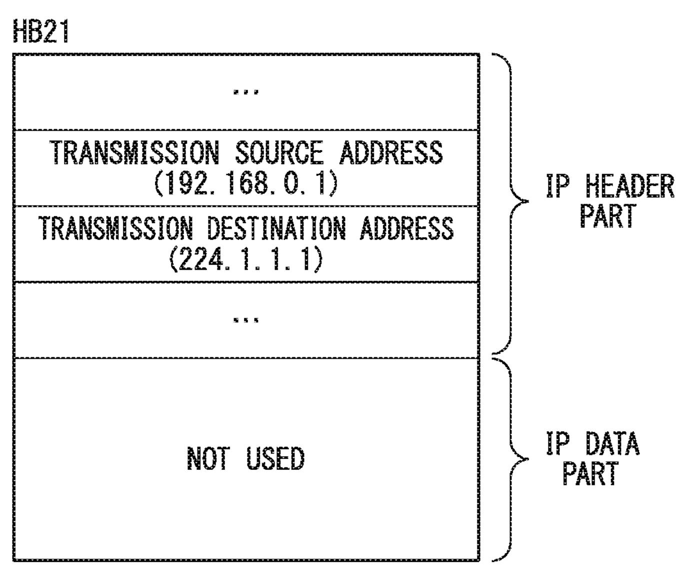
FIG. 11B is a drawing illustrating an example of the heartbeat signal transmitted by multicast from the service providing device in the second configuration of the service providing system in the embodiment.

Next, the heartbeat signal transmitted from the service providing device in the second configuration of the service providing system will be described with reference to FIG. 11A and FIG. 11B. FIG. 11A and FIG. 11B are drawings illustrating an example of the heartbeat signal transmitted from the service providing device in the second configuration of the service providing system in the embodiment.

As shown in FIG. 11A, in the HB21 illustrated as the heartbeat signal, like the HB11 of the service providing system 10 described in FIG. 2, an IP address (192.168.0.1) which is an address for HB communication of the service providing device 21 is used as a transmission source address. In FIG. 11A, an IP address (192.168.0.255, in a case that subnet mask is 255.255.255.0) which is an address for broadcast is used as the transmission destination address. By broadcasting the heartbeat signal, the number of transmissions of IP packets can be reduced, and the redundant operation can be performed without changing the transmission destination address even if a device connected to the network is changed.

As shown in FIG. 11B, in the HB21, an IP address (224.1.1.1) which has been set beforehand as an address for multicast is used as a transmission destination address. By multicasting the heartbeat signal, the number of transmissions of IP packets can be reduced, and a load of an NIC in a device connected to the network can be reduced. The explanation of the heartbeat signal transmitted from the service providing device in the second configuration of the service providing system shown in FIG. 11 is ended.

Next, the heartbeat list transmitted from the relaying device in the second configuration of the service providing system will be described with reference to FIG. 12 and FIG. 13. FIG. 12 and FIG. 13 are drawings illustrating an example of the heartbeat list transmitted from the relaying device in the second configuration of the service providing system in the embodiment.

FIG. 12 represents an HBL23 which is a heartbeat list transmitted from the service providing device 23 of the single structure. The HBL23 represents an IP packet which has an IP header part and an IP data part. The HBL23 is generated by the information list generator 234 based on the received heartbeat signal.

The IP header part of the HBL23 includes a transmission source address and a transmission destination address of a packet. As the transmission source address, an IP address (192.168.0.3) which is an address for HB communication of the service providing device 23 is used. As the transmission destination address, an IP address (192.168.0.2) which is an address for HB communication of the alternative service providing device 22 is used. Since the HBL23 is also transmitted to the alternative service providing device 25, the transmission destination address transmitted to the alternative service providing device 25 is an IP address (192.168.0.5).

The information list generator 234 records the transmission source address (192.168.0.1) of the HB21 and the transmission source address (192.168.0.4) of the HB24 described in FIG. 8 in the IP data part of the HBL23 as received HB addresses. Information of three cycles of the HB21 and the HB24 which are transmitted every 0.2 seconds is recorded in the HBL23. Since the HBL13 includes the heartbeat information of three cycles of the HB21 and the HB24, the number of packet transmission times of the heartbeat list can be reduced to ⅙.

If data amount of the IP data part increases, a load of the process in determining whether or not the heartbeat information of the pair-service providing device is included in received the heartbeat list increases. For example, only the heartbeat information based on the newest heartbeat signal is included in the heartbeat list in order to reduce the data amount of the IP data part.

FIG. 13 represents a HBL25 which is a heartbeat list transmitted from the alternative service providing device 25. The HBL25 is generated by the information list generator 254 based on the received heartbeat signal.

The transmission source address and the transmission destination address of the packet are included in the IP header part of the HBL23. As the transmission source address, an IP address (192.168.0.3) which is an address for HB communication of the service providing device 23 is used. As the destination address, an IP address (192.168.0.2) which is an address for HB communication of the alternative service providing device 22 is used.

The information list generator 254 records, in the IP data part of the HBL25, the transmission source address (192.168.0.1) of the HB21 and the transmission source address of (192.168.0.3) of the HB23 described in FIG. 8 as reception HB addresses.

The explanation of the heartbeat list transmitted from the relaying device in the second configuration of the service providing system shown in FIG. 12 and FIG. 13 is ended.

As described above, the service providing device of the embodiment is included in the process control system in the plant. The service providing device includes a communicator, a service provider, and a heartbeat transmitter. The communicator performs communication via a network. The service provider performs a service via the communicator by exclusively assigning the first identification information to one of the service providing device and the alternative service providing device. The first identification information is common to an alternative service providing device which performs the service instead of the service providing device. The heartbeat transmitter transmits heartbeat information for notifying that the service is normal to the alternative service providing device via a relaying device by using second identification information which is different from the first identification information. Thereby, the service providing device can prevent the service from becoming unstable.

The present embodiment may also be implemented in the following manner.

For example, the present embodiment can be used for a network communication function of the process control system. In the process control system, the present embodiment can be used in a system in which control processing machines are connected to each other through the network, or a control processing machine and an operation monitoring machine are connected to each other through the network.

The present embodiment can also be used in a system which automatically assigns an address for application communication and an address for diagnosis communication and manages them. For example, the present embodiment can be used in a system which uses FOUNDATION Fieldbus protocol (HSE: High Speed Ethernet), HART protocol, Vnet protocol, and so on.

In the present embodiment, heartbeat is used, but not limited thereto. For example, all devices connected to the network transmit packets (diagnosis communication packets) for notifying that the device itself is alive by a multi-address transmission at a constant period, and each device receiving the packet may generate a "live-list" of a device which is a management/holding target, and may update it. The live-list represents live-information at the present time of all the devices on the control network, and the live-list is managed/held by each device on the control network. The live-list may also include information of a communication path from a transmission-side device to a reception-side device. The live-list is updated in accordance with whether or not a diagnosis communication packet transmitted from each machine by a multi-address transmission at a constant period is received. In the live-list, "live" is recorded as a status of each device if the diagnosis communication packet transmitted from each device at the constant period has been received, and "abnormal" is recorded if the diagnosis communication packet has not been received for a fixed period. In the present embodiment, when using the live-list, information of a service providing device which is a pair of its own redundancy configuration may be registered in the alternative service providing device. That is, if the pair-service providing device is included in the live-list, the service providing device may maintain the standby state. On the other hand, if the pair-service providing device is not included in the live-list, the service providing device may change from the standby state to the active state and may perform the service instead of the pair-service providing device. The alternative service providing device of the present embodiment can use information such as the live-list in order to manage the service providing device which is a pair of redundant configuration.

As described above, in a case that the gateway device such as a router has a relay function of relaying heartbeat information to the alternative service providing device, even if there is a communication partner connected to a different segment (a different domain in a case of Vnet communication) such as another router, the router may not transmit and route the live-list to the different segment. This is to prevent a load of the communication from increasing. If the device connected to the same segment device holds a live-list which is exchanged, a live-state of each device can be diagnosed. For this reason, the load of the network communication can be reduced, and the entire system can be prevented from becoming unstable.

For example, one or more programs for implementing the functions of the device described in the present embodiment may be stored in a non-transitory computer readable storage medium, and the one or more programs stored in the non-transitory computer readable storage medium may be read and executed by a computer system to perform the above-described various kinds of services of the present embodiments. The "computer system" may include hardware, such as an OS and a peripheral device. If the "computer system" uses a WWW system, the "computer system" also includes a homepage providing environment (or a displaying environment). The "non-transitory computer readable storage medium" is a storage device, such as a flexible disk, a magneto-optical disk, a ROM, a writable nonvolatile memory such as a flash memory, a portable medium such as a CD-ROM, and a hard disk drive built in the computer system.

Furthermore, similar to a volatile memory (for example, DRAM (Dynamic Random Access Memory)) in the computer system used as a server or a client when the program is transmitted through a network such as the Internet or a communication line such as a telephone line, the "non-transitory computer readable storage medium" includes a memory holding the program for a predetermined period. The program may be transmitted from the computer system storing the program in a storage device to another computer system, through a transmission medium or by a transmission wave in the transmission medium. Here, the "transmission medium" which transmits the program is a medium which has a function of transmitting information, similar to a network (communication network) such as the Internet, and a communication line such as a telephone line. The program may be for implementing a part of the function described above. Furthermore, the function described above may be implemented in combination with a program which has already stored in the computer system, or may be a so-called patch file (differential program).

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A relaying device comprising:

a communicator that is a network interface device, and configured to communicate with a service providing device and an alternative service providing device via a network, the service providing device being configured to provide a service by using first identification information, the alternative service providing device being configured to provide the service instead of the service providing device by using the first identification information;

a heartbeat information receiver configured to receive heartbeat information for notifying that the service provided by the service providing device is normal, the heartbeat information being transmitted from the service providing device to the relaying device by using second identification information;

an information generator that is implemented by a processor that executes one or more programs stored in a memory, and configured to generate relay information based on the heartbeat information received by the heartbeat information receiver; and a relay information transmitter configured to transmit the relay information generated by the information generator to the alternative service providing device, wherein the first identification information assigned to the service providing device is the same as the first identification information assigned to the alternative service providing device, wherein the second identification information assigned to the service providing device is different from the second identification information assigned to the alternative service providing device, and wherein the second identification information is an address for communication of the heartbeat information.

2. The relaying device according to claim 1, wherein the heartbeat information receiver is configured to receive the heartbeat information of a plurality of service providing devices, and wherein the information generator is configured to generate the relay information based on the heartbeat information of the plurality of the service providing devices.

3. The relaying device according to claim 1, wherein the heartbeat information receiver is configured to receive a plurality of pieces of the heartbeat information of the service providing device, and wherein the information generator is configured to generate the relay information based on the plurality of the pieces of the heartbeat information.

4. The relaying device according to claim 1, further comprising:

a service utilizer that is implemented by the processor, and configured to utilize the service provided by the service providing device or the alternative service providing device by using first identification information common to the service providing device and the alternative service providing device.

5. The relaying device according to claim 1, further comprising:

a pair list storage configured to store a pair list in which the service providing device and the alternative service providing device has been associated with each other, wherein the relay information transmitter is configured to transmit the relay information to the alternative service providing device which has been associated with the service providing device based on the pair list.

* * * * *